(12) United States Patent
Ishaaya et al.

(10) Patent No.: US 10,079,466 B2
(45) Date of Patent: Sep. 18, 2018

(54) MULTI-PUMP-PASS FIBER BASED LASERS AND AMPLIFIERS

(71) Applicant: B.G. NEGEV TECHNOLOGIES AND APPLICATIONS LTD., AT BEN GURION UNIVERSITY, Beer Sheva (IL)

(72) Inventors: Amiel A. Ishaaya, Nes Ziona (IL); Boris Rosenstein Levin, Dimona (IL)

(73) Assignee: B. G. Negev Technologies and Applications Ltd. at Ben-Gurion University, Beer Sheva (IL)

( * ) Notice: Subject to any disclaimer, the term of this patent is extended or adjusted under 35 U.S.C. 154(b) by 0 days.

(21) Appl. No.: 15/111,938

(22) PCT Filed: Jan. 20, 2015

(86) PCT No.: PCT/IL2015/050068
§ 371 (c)(1),
(2) Date: Jul. 15, 2016

(87) PCT Pub. No.: WO2015/111046
PCT Pub. Date: Jul. 30, 2015

(65) Prior Publication Data
US 2016/0344153 A1 Nov. 24, 2016

Related U.S. Application Data

(60) Provisional application No. 61/929,989, filed on Jan. 22, 2014.

(51) Int. Cl.
*H01S 3/09* (2006.01)
*H01S 3/094* (2006.01)
(Continued)

(52) U.S. Cl.
CPC .... *H01S 3/094015* (2013.01); *H01S 3/06708* (2013.01); *H01S 3/06754* (2013.01);
(Continued)

(58) Field of Classification Search
CPC .......... H01S 3/094015; H01S 3/06708; H01S 3/06754; H01S 3/094007; H01S 3/11; H01S 3/005; H01S 3/094049; H01S 3/1618
See application file for complete search history.

(56) References Cited

U.S. PATENT DOCUMENTS 5,710,786 A * 1/1998 Mackechnie ..... H01S 3/094003
372/102
2009/0080469 A1* 3/2009 Nikolajsen ........... G02B 6/2817
372/6
(Continued)

FOREIGN PATENT DOCUMENTS

DE 10 2009 003 153 A1 11/2010
RU 120285 U1 9/2012
(Continued)

OTHER PUBLICATIONS

International Search Report dated May 10, 2015 from corresponding International Application No. PCT/IL2015/050068, 4 pages.
(Continued)

*Primary Examiner* — Armando Rodriguez
(74) *Attorney, Agent, or Firm* — Ohlandt, Greeley, Ruggiero & Perle, L.L.P.

(57) ABSTRACT

The invention is optical configurations for constructing laser oscillators or laser amplifiers that comprise an extremely short fiber (typically tens of cm long or below, e.g. 5 cm to 30 cm). In order to overcome the absorption limitation due to the very short length of the fiber, the present invention employs a multi pump-pass scheme for pump light confine-
(Continued)

ment. This scheme is based on the small angular overlap between the lasing and pump beams. The multi pump-pass method of the invention leads to efficient fiber laser oscillators and amplifiers having pulse duration of a few ns, with high average and peak power output that is comparable to the state-of-the-art solid state lasers.

21 Claims, 9 Drawing Sheets

(51) Int. Cl.
| | |
|---|---|
| H01S 3/067 | (2006.01) |
| H01S 3/11 | (2006.01) |
| H01S 3/16 | (2006.01) |
| H01S 3/00 | (2006.01) |
| H01S 3/06 | (2006.01) |

(52) U.S. Cl.
CPC .......... *H01S 3/094007* (2013.01); *H01S 3/11* (2013.01); *H01S 3/005* (2013.01); *H01S 3/0621* (2013.01); *H01S 3/06741* (2013.01); *H01S 3/094049* (2013.01); *H01S 3/1618* (2013.01)

(56) References Cited

U.S. PATENT DOCUMENTS

| | | | |
|---|---|---|---|
| 2010/0329289 A1* | 12/2010 | Taylor | G02B 6/02042 372/6 |
| 2011/0069723 A1* | 3/2011 | Dong | H01S 3/06716 372/6 |
| 2013/0028276 A1 | 1/2013 | Minelly et al. | |
| 2013/0100972 A1 | 4/2013 | Creeden | |
| 2013/0128904 A1* | 5/2013 | Ishaaya | H01S 3/067 372/6 |

FOREIGN PATENT DOCUMENTS

| | | |
|---|---|---|
| WO | 2012/014191 A1 | 2/2012 |
| WO | 2012014191 A1 | 2/2012 |
| WO | 2013/098620 A1 | 7/2013 |

OTHER PUBLICATIONS

Written Opinion dated May 10, 2015 from corresponding International Application No. PCT/IL2015/050068, 5 pages.
International Search Report dated Nov. 30, 2011 from International Application No. PCT/IL2011/000502, 3 pages.
Written Opinion dated Nov. 30, 2011 from International Application No. PCT/IL2011/000502, 6 pages.
Richardson et al.; "High power fiber lasers: current status and future perspectives [Invited]", vol. 27, No. 11, Nov. 2010, J. Opt. Soc. Am. B; pp. B63-B 92.
Rosenstein, et al.; "Experimental characterization of an off-axis scheme for pumping high-power photonic crystal fiber lasers", Applied Physics B, 2014, 114:327-331.
Shulga et al.; "Off-axis pumping of a photonic crystal fiber laser"; Applied Physics B, 2010, 101: 701-704.
Supplementary European Search Report for the corresponding international application No. EP15740390, dated Sep. 14, 2017, 7 pages.

* cited by examiner

MULTI-PUMP-PASS FIBER BASED LASERS AND AMPLIFIERS

FIELD OF THE INVENTION

The present invention relates to the field of lasers and laser amplifiers. Specifically, the invention relates to the field of optical configurations for fiber laser oscillators and amplifiers.

BACKGROUND OF THE INVENTION

Publications and other reference materials referred to herein are numerically referenced in the following text and respectively grouped in the appended Bibliography which immediately precedes the claims.

Currently, in order to achieve high peak and average power pulses having a pulse length of a few ns with good beam quality one should use master oscillator power amplifier (MOPA) fiber systems or solid-state lasers. The reason for this is the fact that in the ns pulse range the limitation on the shortest pulse duration is the time of flight of the photon in the cavity. Accordingly, in order to achieve a 1 ns pulse the cavity should be shorter than 20 cm. Taking into account the fact that this particular cavity should include optical components (such as collimating and focusing optics, polarization optics and q-switch) together with the active medium forces the maximum length of the active fiber to be around 10 cm long. Moreover, it is well known that amplified spontaneous emission (ASE) gain and nearly all non-liner effects are strongly dependent on the length of the light-matter interaction. Accordingly, the shorter the fiber, the lower the ASE gain and induced non-linear effects. However, it is a very serious challenge to design such a system, due to low pump absorption in an active fiber, which diminishes exponentially upon reducing the length of the fiber. Thus the use of short fibers as a gain medium promises to result in highly inefficient laser operation.

It is therefore a purpose of the present invention to provide a laser source based on a very short active fiber (typically tens cm or below) that emits pulses having a pulse duration of a few ns and high peak and average power.

Further purposes and advantages of this invention will appear as the description proceeds.

SUMMARY OF THE INVENTION

In a first aspect the invention is a laser oscillator or amplifier comprising a short length of active fiber as a lasing/amplifying medium, a front side optical configuration, and a rear side optical configuration. The front side optical configuration and the rear side optical configuration both comprise optical elements that cause a pump beam to pass back and forth multiple times through the active fiber.

In embodiments of the laser oscillator or amplifier of the invention the active fiber has a high ratio of the clad numerical aperture (NA) to the core NA. In embodiments of the laser oscillator or amplifier of the invention the active fiber is one of: a photonic crystal fiber (PCF), an air-clad fiber, or a special double-clad fiber. In embodiments of the laser oscillator or amplifier of the invention the length of the active fiber is in the range of 5 cm to 30 cm.

In embodiments of the laser oscillator or amplifier of the invention the front side optical configuration is comprised of the group of optical elements selected from one of the following groups:

a. a front lens, a front concave spherical mirror, and an optional partially reflecting coating on the front facet of the active fiber;
b. a partially reflecting output coupler, a front lens, a front concave spherical mirror, and an optional anti-reflecting coating on the front facet of the active fiber;
c. a dichroic mirror, a front lens, a front concave spherical mirror, and an optional partially reflecting coating on the front facet of the active fiber; and
d. a partially reflecting output coupler, a dichroic mirror, a front lens, a front concave spherical mirror, and an optional anti-reflecting coating on the front facet of the active fiber.

In embodiments of the laser oscillator or amplifier of the invention the front ends in group 'a' and group 'b' are configured for off-axis pumping wherein the pump beam travels from the pump source to the front facet of the active fiber via an optical delivery fiber, which is coupled to the active fiber within the numerical aperture of the pump clad of the active fiber. In these embodiments the front concave spherical mirror has a central opening for the lasing beam and an off-center opening for the pump beam.

In other embodiments of the laser oscillator or amplifier of the invention the front ends in group 'c' and group 'd' are configured for on-axis pumping wherein the pump beam travels from the pump source to the front facet of the active fiber through free space. In these embodiments that comprise a rear concave spherical mirror, the rear concave spherical mirror has a central opening for the lasing beam and for the pump beam.

In embodiments of the laser oscillator of the invention the back side optical configuration is comprised of the group of optical elements selected from one of the following groups:

a. a dichroic mirror coating on the rear facet of the active fiber, a rear lens and a highly reflecting rear mirror;
b. an optional anti-reflecting coating on the rear facet of the active fiber, a rear concave spherical mirror, a rear lens and a highly reflecting rear mirror;
c. a dichroic mirror coating on the rear facet of the active fiber and a highly reflecting rear mirror; and
d. a highly reflecting coating on the rear facet of the active fiber.

In embodiments of the amplifier of the invention the back side optical configuration is comprised of the group of optical elements selected from one of the following groups:

a. a dichroic mirror coating on the rear facet of the active fiber and a rear lens; and
b. an optional anti-reflecting coating on the rear facet of the active fiber, a rear concave spherical mirror and a rear lens.

In embodiments of the laser oscillator of the invention group 'a' and group 'b' comprise a Q-switch in pulsed laser configurations.

In a second aspect the invention is a method for constructing an efficient multi-pass short fiber laser oscillator. The method comprises positioning a short length of active fiber in the space between one front end chosen from the groups of front ends of the first aspect of the invention and one back end chosen from the groups of back ends of the first aspect of the invention.

In embodiments of the method of the second aspect of the invention the active fiber has a high ratio of the clad numerical aperture (NA) to the core NA. In embodiments of the second aspect of the method of the invention the active fiber is one of: a photonic crystal fiber (PCF), an air-clad fiber, or a special double-clad fiber. In embodiments of the method of the second aspect of the invention the length of the active fiber is in the range of 5 cm to 30 cm.

In a third aspect the invention is a method for constructing an efficient multi-pass short fiber laser amplifier. The method comprises positioning a short length of active fiber in the space between one front end chosen from the groups of front ends of the first aspect of the invention and one back end chosen from the groups of back ends of the first aspect of the invention. In embodiments of the method of the third aspect of the invention the active fiber has a high ratio of the clad numerical aperture (NA) to the core NA. In embodiments of the method of the third aspect of the invention the active fiber is one of: a photonic crystal fiber (PCF), an air-clad fiber, or a special double-clad fiber. In embodiments of the method of the third aspect of the invention the length of the active fiber is in the range of 5 cm to 30 cm.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The invention is optical configurations for constructing laser oscillators or laser amplifiers that comprise an extremely short fiber (typically tens of cm long or below, e.g. 5-30 cm). In order to overcome the absorption limitation (until today, the maximal commercially available absorption is 30 dB/m @976 nm for PCFs) due to the very short length of the fiber, the present invention employees a multi pump-pass scheme for pump light confinement. This scheme is based on small angular overlap between the lasing and pump beams, which is typically the case in air clad and other special double clad fibers. The multi pump-pass method of the invention leads to fiber power oscillator lasers having a pulse duration of a few ns with high average and peak power output and with high efficiency that is comparable to the state-of-the-art fiber lasers.

Figure 1A:
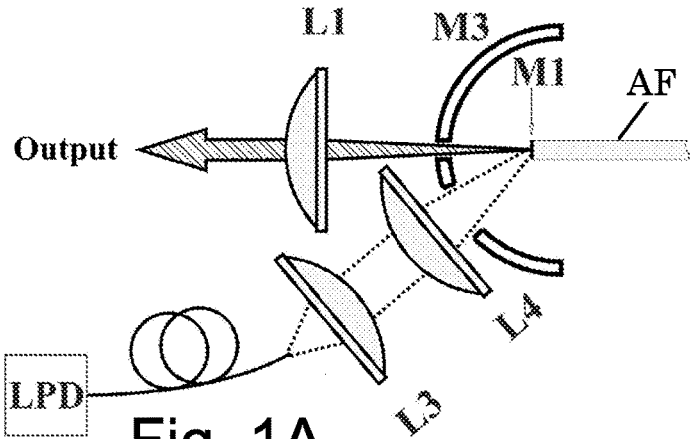
FIG. 1A schematically shows a front side embodiment of an off-axis pumped short optical fiber pulsed or continuous laser oscillator without an external output coupler or amplifier according to the invention.
Figure 1B:
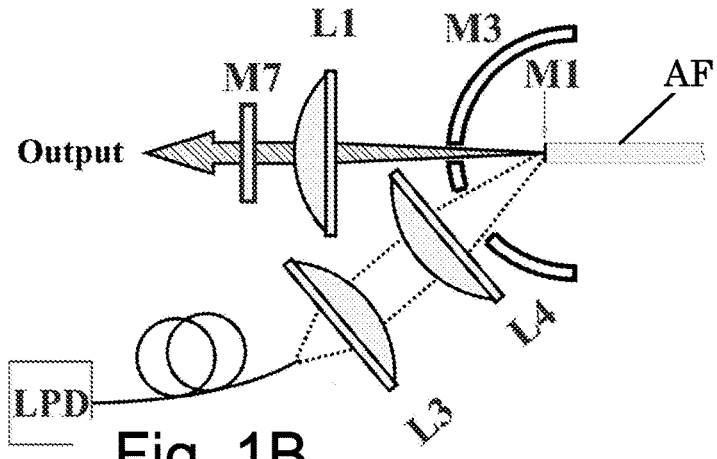
FIG. 1B schematically shows a front side embodiment of an off-axis pumped short optical fiber pulsed or continuous laser oscillator with external output coupler according to the invention.
Figure 1C:
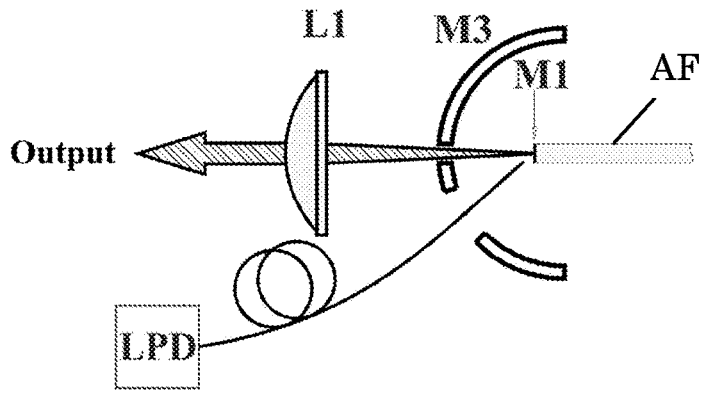
FIG. 1C schematically shows a front side embodiment of an off-axis direct pumped short optical fiber laser oscillator pulsed or continuous without an external output coupler or amplifier according to the invention.
Figure 1D:
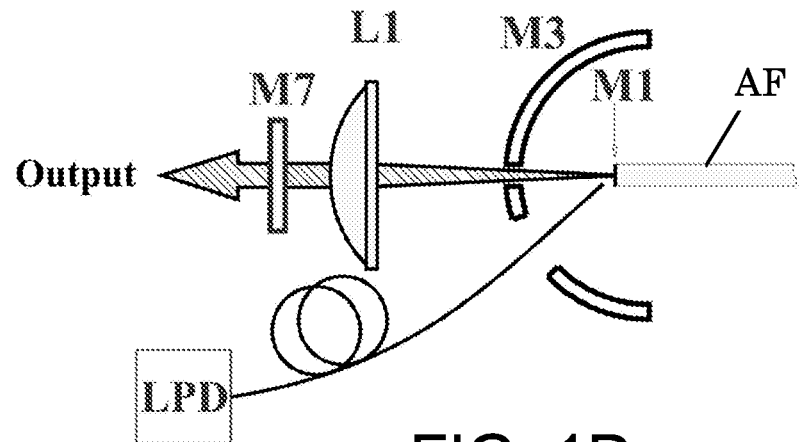
FIG. 1D schematically shows a front side embodiment of an off-axis direct pumped short optical fiber pulsed or continuous laser oscillator with external output coupler according to the invention.

In general, any laser oscillator and amplifier embodiment can be divided to a front side (the output side) and a rear side. With fiber based lasers or amplifiers these sides can be chosen independently following the specific requirements. Six basic front side embodiments for the short optical fiber laser oscillator of the invention are schematically presented respectively in FIGS. 1A-F, and for the short optical fiber amplifier of the invention are schematically presented respectively in FIGS. 1A, 1C and 1E. Six basic rear side embodiments for the short optical fiber laser oscillator of the invention are schematically presented respectively in FIGS. 2A-B and 2E-F, and for the short optical fiber amplifier of the invention are schematically presented respectively in FIGS. 2C-D. The desired laser (pulsed or continuous) or amplifier configuration can be comprised of the appropriate combination from any of these front and rear side embodiments.

Figure 1E:
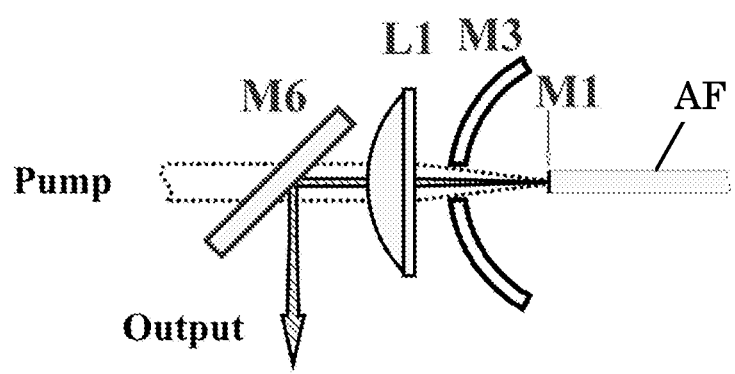
FIG. 1E schematically shows a front side embodiment of an on-axis pumped short optical fiber laser oscillator pulsed or continuous without external output coupler (M7) or amplifier according to the invention.
Figure 1F:
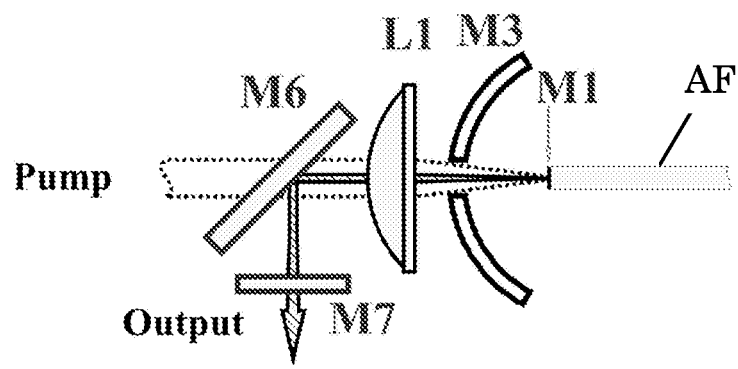
FIG. 1F schematically shows a front side embodiment of an on-axis pumped short optical fiber pulsed or continuous laser oscillator with external output coupler (M7) according to the invention.

With these combinations of the front and rear side embodiments, the laser oscillator or amplifier is comprised of a short (typically tens cm long or below), active optical PCF or other air clad or suitable double clad fiber; a rear lens (L2), which focuses laser beam into the active fiber (AF) and collimates it when it exits from the rear facet of the active fiber (in the laser configuration only); a coating (M1) on the front end facet of the active fiber (AF), which may be either a partial reflecting output coupler coating with laser configuration (FIGS. 1A, 1C, and 1E), or an optional anti-reflecting coating with laser configurations (FIGS. 1B, 1D, and 1F) or with amplifier configurations (FIGS. 1A, 1C, and 1E); a coating (M2) on the rear end facet of the active fiber (AF), which may be either a dichroic mirror with high transmittance at lasing wavelength range and high reflectance at pump wavelength range (FIGS. 2A, 2C, and 2E), or an optional anti-reflecting coating (FIGS. 2B and 2D), or highly reflecting coating (FIG. 2F); a front concave spherical mirror (M3), which reflects the pump beam back to the fiber, and has one central opening to enable lossless propagation of the lasing and pumping beams through it with on-axis configuration (FIGS. 1E-F), or one central opening to enable lossless propagation of the lasing beam and one off-center opening to enable lossless propagation of the pump beam through it with off-axis configuration (FIGS. 1A-D); a rear concave spherical mirror (M4), which reflects the pump beam back to the fiber, and has one central opening to enable lossless propagation of the lasing beam through it (FIGS. 2B and 2D), and dichroic mirror with on-axis pumping configuration (M6 as shown in FIGS. 1E-F) to separate between the laser and pump beams.

With laser oscillator configuration (combination of FIGS. 1A-F with FIGS. 2A-B and 2E), the oscillator is comprised of:
- a flat highly reflective rear mirror (M5), which may be either a broadband mirror or a narrowband volume Bragg grating (VBG) mirror (with the latter a narrowband laser operation is obtained);
- an output coupler, which may be implemented either as an optional partial reflecting coating (M1 as shown in FIGS. 1A, 1C, and 1E) at the end of the fiber or as a free-space flat mirror (M7 as shown in FIGS. 1B, 1D, and 1F);
- a front lens (L1) is necessary only with external output coupler M7 and/or with on-axis pumping configuration, which collimates the lasing beam as it out from the front facet of the active fiber and focuses it when it reflects back to the active fiber from the external output coupler M7, with on-axis pumping configuration it focuses the pump beam into the active fiber; and
- a Q-switch (Q-SW) in the case of pulsed laser configuration (FIGS. 2A and 2B) or without Q-SW in the case of continuous laser source (FIGS. 2A-2B and 2E-2F).

With the off-axis indirect pumping configuration the pump beam collimating and focusing lenses (L3 and L4, respectively), as shown in FIGS. 1A and 1B, should be designed to suit the acceptance cone of the pump clad (i.e. the numerical aperture (NA) of the pump clad) of the active optical fiber. The front end arrangements shown in FIG. 1A and FIG. 1B have been previously described by the inventors of the present invention in [2,4]. Finally, the concave mirrors M3 and M4 are used in order to reflect the pump beam back to the fiber. This is the multi pump-pass configuration. Therefore, the pump absorption in the short active fiber is drastically increased, and enables increased efficiency of short fiber laser to the typical values of the state-of-the-art fiber lasers (>60%) [1].

Figure 4:
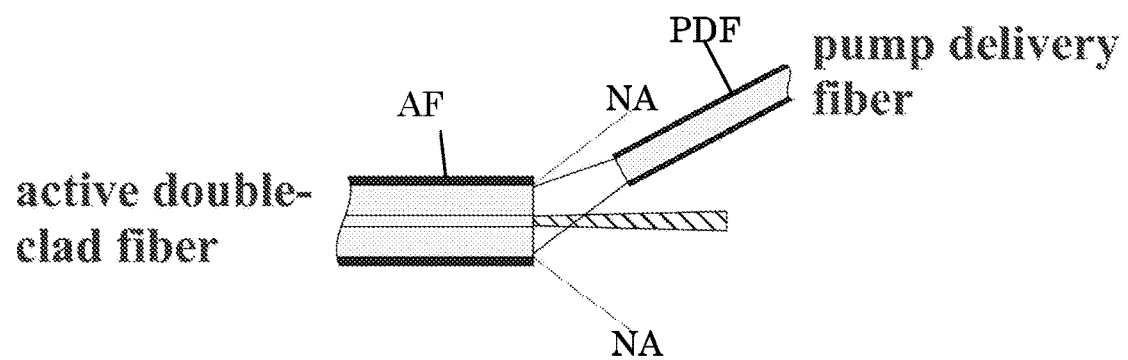
FIG. 4 schematically shows the embodiment of an off-axis direct pumping technique.

The main difference between the off-axis pumping configurations shown in FIGS. 1A-B and FIGS. 1C-D (in addition to aforementioned differences) is the pumping beam coupling scheme. The design of the pump beam coupling in FIGS. 1A-B is based on the focusing the pump beam with lens L4 within NA of the pump clad [2,3,4], and in FIGS. 1C-D is based on coupling, with an air gap but no optics, of the pump beam from the pump delivery fiber PDF to the suitable active fiber within the NA of the pump clad as shown in FIG. 4.

The multi pump-pass pumping design of the invention is basically based on the pair of concave spherical mirrors (M3 and M4 in FIGS. 1A-F in combination with FIGS. 2B and 2D) or on the front concave spherical mirror (M3 in FIGS. 1A-D in combination with the rear coating or butt coupled mirror in FIGS. 2A, 2C, 2E and 2F). In this approach, the ends of the active fiber are placed in the center of the curvature of the mirrors. Therefore, the pump beam is incident on these concave mirrors at 0 degrees and is reflected back to the fiber. The rear concave spherical mirror (M4) has a central opening as seen in FIG. 3A to enable lossless propagation of the lasing beam through it. The radius of this central opening is determined by the distance between the concave mirror and the fiber end, which depends on the radius of curvature of the concave mirror. On the other hand, the front concave spherical mirror (M3) has a different arrangement of openings. With the on-axis configuration, it has only one central opening as shown in FIG. 3A, which is suitable for lossless propagation of both lasing beam and the pump beam from the pump module. But with the off-axis configuration, front mirror M3 has two openings as shown in FIG. 3B. The central opening is for the lasing beam and the off-center opening is for the pump beam.

Figure 5:
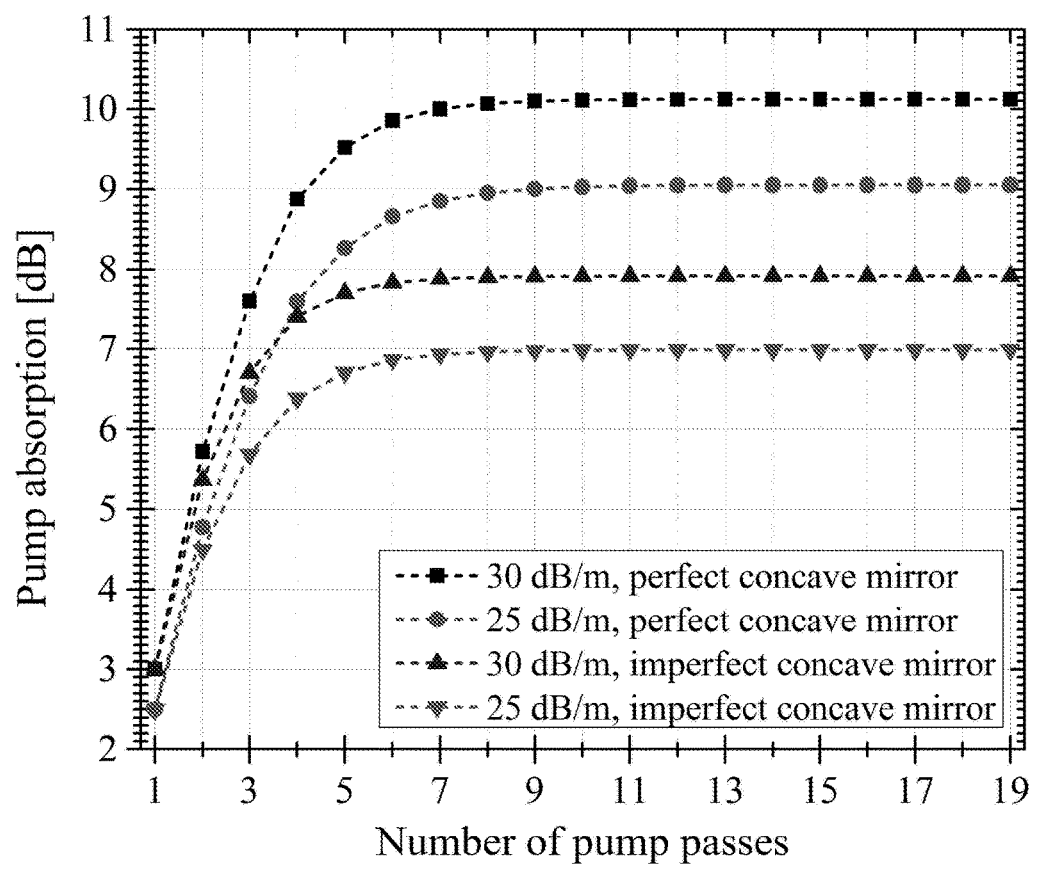
FIG. 5 shows the calculated pump absorption as a function of the number of pump passes for a 10 cm long active photonic crystal fiber (PCF) with perfect and imperfect concave spherical mirrors.

Efficient pump absorption can easily lead to efficient operation of the short fiber laser or amplifier. The inventors have calculated the influence of the number of pump passes on the total pump absorption by assuming two general cases: a case of perfect concave mirrors (100% reflectivity coating, wherein the reflected pump light has exactly the same optical path as the incident one) and a case of imperfect concave mirrors (95% of the incident pump light returns to the pump clad of the active fiber, while 5% is lost due to imperfect mirror coating and surface). Each of these two cases also has two sub-cases of pump absorption per unit length: 30 dB/m absorption, which is the amount specified by the manufacturer at 976 nm, and 25 dB/m absorption, which was calculate as an overlap-integral between the spectrum of the pump module and the absorption cross-section of active Yb ions. The calculations, the results of which are summarized in the graph shown in FIG. 5, took into account the off-axis pumping configuration using a front side embodiment as shown if FIGS. 1A-1D and any of the rear side embodiments, a 10 cm long PCF, Fresnel losses on the fiber ends and maximum losses incurred by the sidewise pump-opening in the front concave mirror.

According to these calculations, in all cases and sub-cases, the pump absorption significantly depends on the number of pump passes and reaches its maximum after about 5-6 passes. The best and worst cases, are the ideal concave mirror with highest pump absorption per unit length (30 dB/m) and the imperfect concave mirror with lowest pump absorption per unit length (25 dB/m), respectively.

Figure 2A:
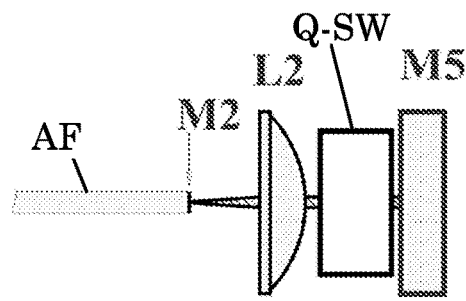
FIG. 2A schematically shows a rear side embodiment of short optical fiber pulsed (with Q-switch) or continuous (without Q-switch) laser oscillator with dichroic rear coating (M2) on the fiber according to the invention.
Figure 2B:
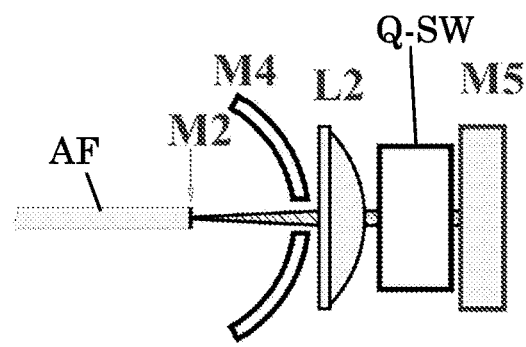
FIG. 2B schematically shows a rear side embodiment of short optical fiber pulsed (with Q-switch) or continuous (without Q-switch) laser oscillator with an optional anti-reflective rear coating (M2) on the fiber according to the invention.
Figure 2C:
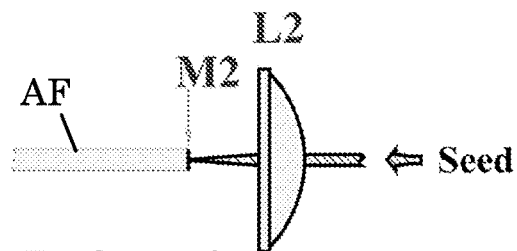
FIG. 2C schematically shows a rear side embodiment of short optical fiber pulsed or continuous amplifier with dichroic rear coating (M2) on the fiber according to the invention.
Figure 2D:
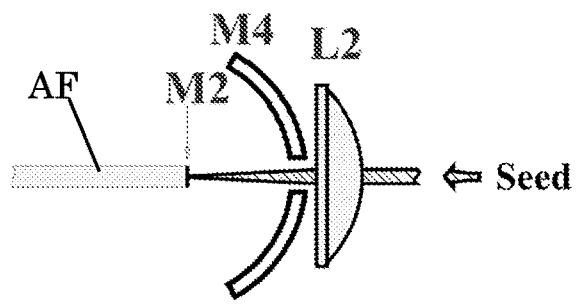
FIG. 2D schematically shows a rear side embodiment of short optical fiber pulsed or continuous amplifier with an optional anti-reflective rear coating (M2) on the fiber according to the invention.
Figure 2E:
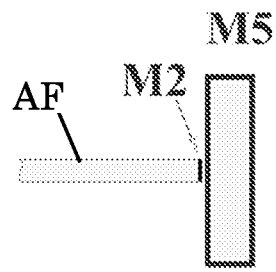
FIG. 2E schematically shows a rear side embodiment of short optical fiber continuous laser oscillator with an optional anti-reflective or dichroic rear coating (M2) on the fiber and butt coupled highly reflective rear mirror (M5) according to the invention.
Figure 2F:
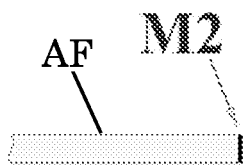
FIG. 2F schematically shows a rear side embodiment of short optical fiber continuous laser oscillator with highly reflective rear coating (M2) on the fiber according to the invention.
Figure 3A:
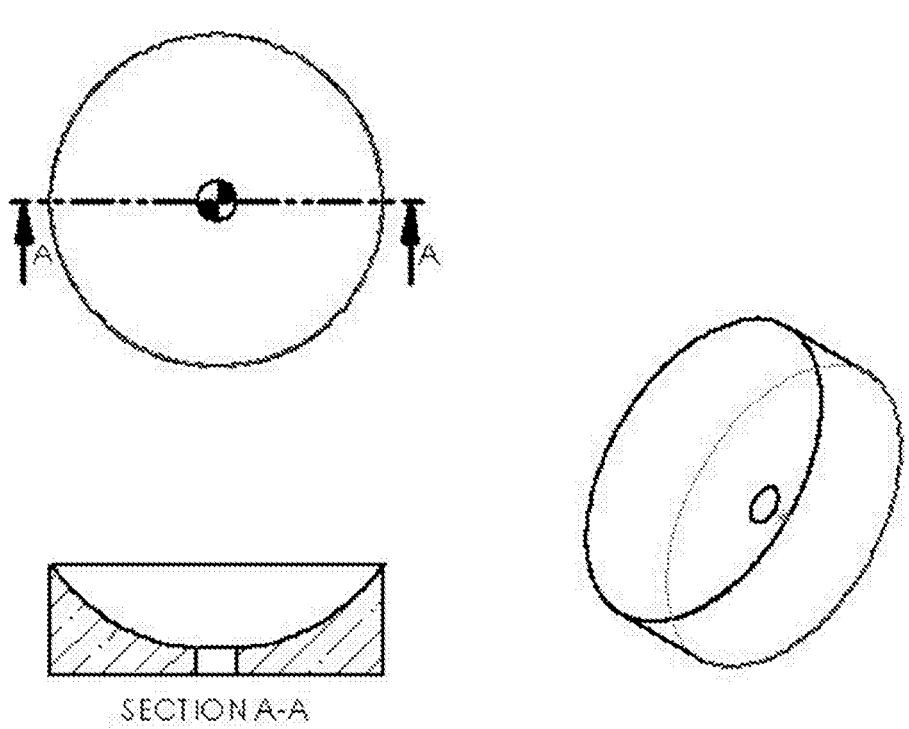
FIG. 3A schematically shows the front concave spherical mirror (M3) for the off-axis pump configurations of FIGS. 1A-D according to the invention.
Figure 3B:
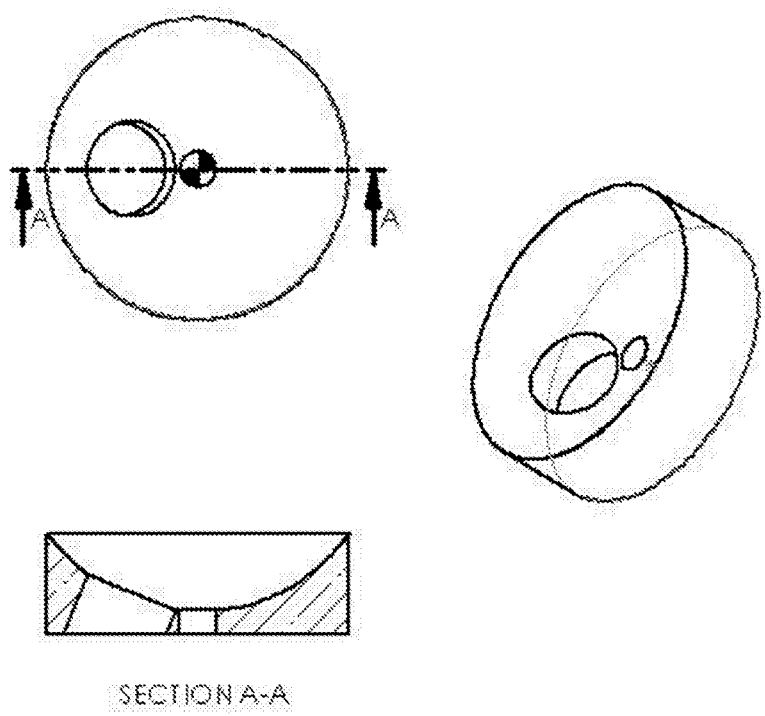
FIG. 3B schematically shows the front concave spherical mirror (M3) for the on-axis pump configurations of FIGS. 1E-F and the rear concave spherical mirror (M4) for the configurations of FIGS. 2B and 2D.
Figure 6:
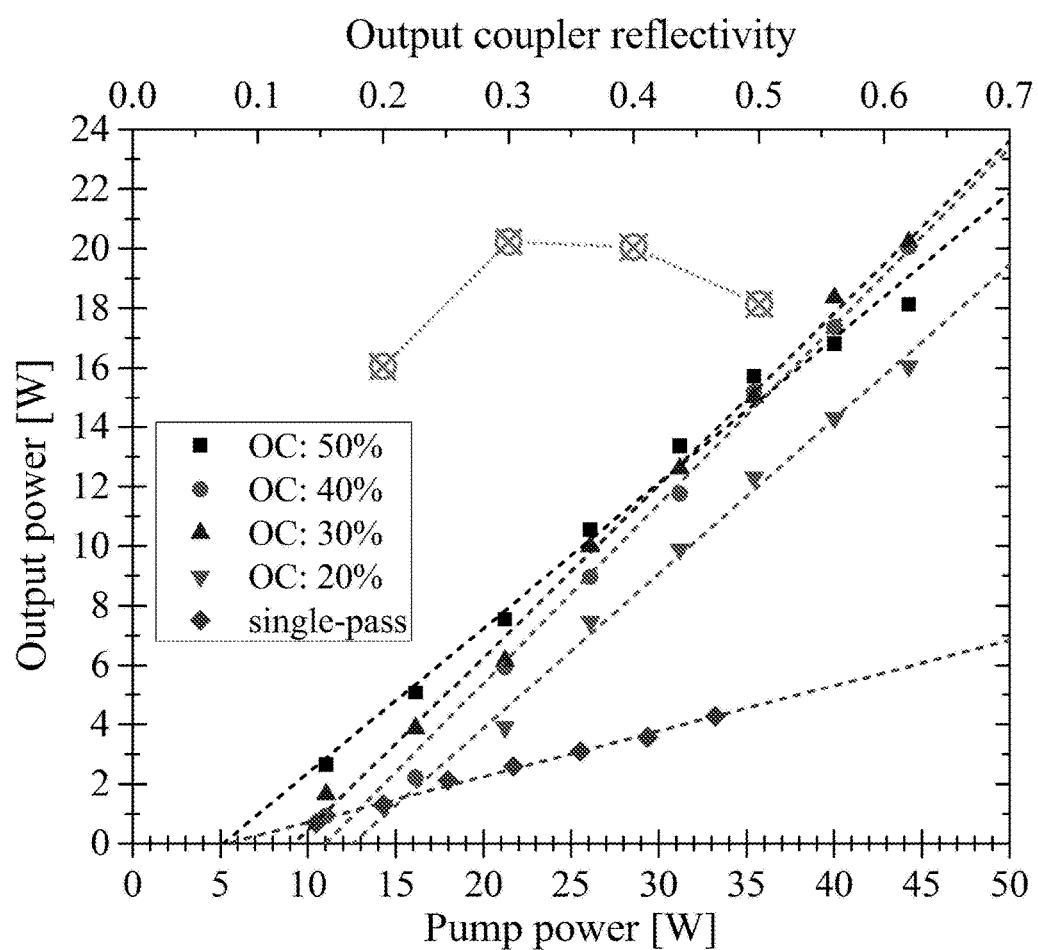
FIG. 6 shows measured CW output power as a function of the pump power using 10 cm long active PCF for output couplers with different reflectivities (dashed line is a linear fit): the squares for 50%, dots for 40%, upwards pointing triangles for 30%, and downwards pointing triangles for 20% reflectivity. The diamond shapes represent results of a single-pass pump with 50% output coupler reflectivity. The crossed circles, which correspond to the upper x-axis, represent the output power as a function of output coupler reflectivity for a 45 W pump power. In this case, the dotted line indicates the general trend.

In order to examine the impact of the reflectivity of the output coupler on the performance of the laser, the inventors built the experimental setup, which combines the front side shown in FIG. 1D and rear side shown in FIG. 2B, they conducted CW experiments (without the Q-switch shown in FIG. 2B). To examine the impact of the multi pass-pumping scheme on laser performance, the inventors considered the single-pass-pumping scheme as a reference by removing the rear and front concave mirrors (M3 and M4) and using a 50% reflectivity output coupler (M7). The measured output power as a function of input pump power for various output couplers (M7) is shown in FIG. 6. The crossed circles represent the output power as a function of output coupler reflectivity (upper x-axis) for a pump power of 45 W. Whereas a single-pass-pumping configuration yields very low lasing performance with a slope efficiency of only 15%, the multi pass-pumping configuration increases the slope efficiency by as much as 400%. Specifically, the highest output power and slope efficiency that was achieved are 18 W and 49%, 20 W and 60%, 20.2 W and 58%, and 16 W and 52%, with output coupler reflectivity of 50%, 40%, 30%, and 20%, respectively. These results are in good agreement with the pump absorption calculations. As evident from the results, in these specific operating conditions, the optimal output coupler reflectivity is between 30% and 40%.

Figure 7:
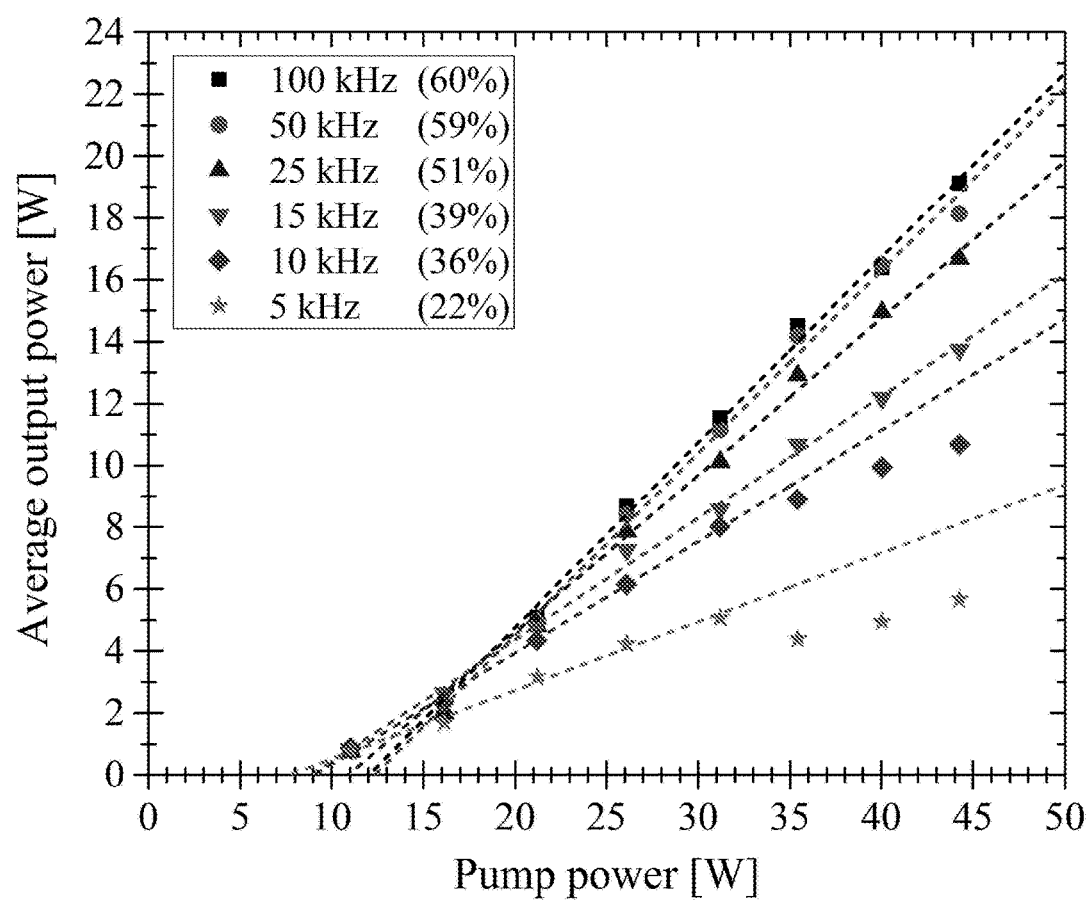
FIG. 7 shows measured pulsed Q-switched average output power as a function of pump power using 10 cm long active PCF at different repetition rates.

Next, using the same optical setup, the inventors conducted Q-switched pulsed experiments at a variety of repetition rates, ranging from 5 kHz to 100 kHz, with a 40% reflectivity output coupler (M7). The results of these experiments are shown in FIG. 7. At repetition rates of 25 kHz and lower, the output pulse energy is measured with a thermal detector (average power divided by repetition rate) and by direct measurements with a pyro-electric detector. An excellent correlation was observed between the two measurements, indicating that parasitic CW lasing does not occur simultaneously with the pulsed operation. As evident from FIG. 7, performance at 50 kHz and 100 kHz repetition rates is close to that obtained in the CW-mode operation. The highest measured average output power is 19.1 W with a slope efficiency of 60%, and 18.1 W with slope efficiency of 59%, obtained at repetition rates of 100 kHz (squares) and 50 kHz (dots), respectively. At the 25 kHz repetition rate (upward pointing triangles), the slope efficiency is slightly decreased to 51%, with a maximum average output power of 16.7 W. At even lower repetition rates, the performance is significantly degraded, with a maximum output power of 13.7 W and slope efficiency of 39% at the 15 kHz repetition rate (downward pointing triangles), 10.7 W and 36% at the 10 kHz repetition rate (diamonds), and 5.7 W and 22% at the 5 kHz repetition rate (stars). The degradation in performance is expected due to increased amplified spontaneous emission at lower repetition rates in the case of CW pumped lasers [1]. It should be noted that, in the case of 10 kHz and 5 kHz repetition rates, the last three points were excluded from the calculation of the slope efficiency due to the observed gain saturation.

Figure 8:
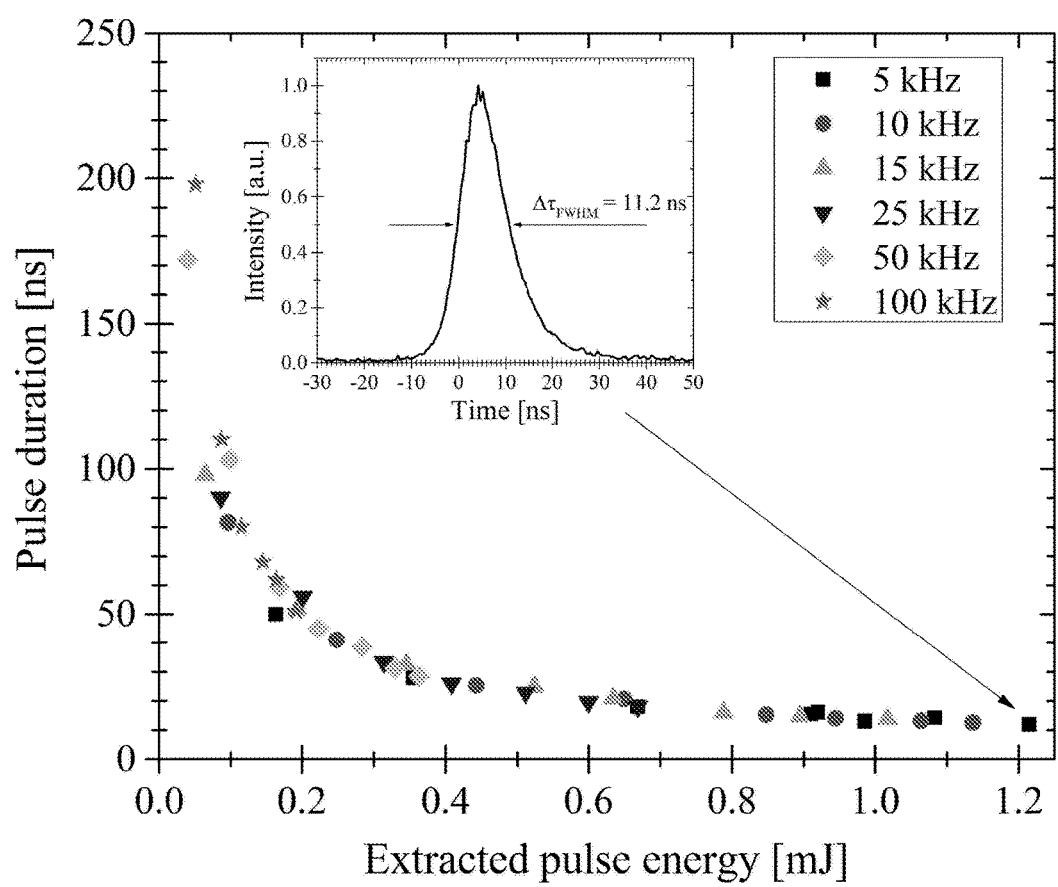
FIG. 8 shows the measured pulse duration as a function of the extracted pulse energy for different repetition rates and using 10 cm long active PCF; inset shows the temporal shape of the pulse at the highest pulse energy.

To calculate the peak power, the pulse duration was measured with a fast photo-diode (12.5 GHz bandwidth, rise/fall time <25 ps). The measured pulse duration as a function of the pulse energy is shown, for the different repetition rates, in FIG. 8. The shortest measured pulse duration of ~12 ns is shown in the inset of FIG. 8 and corresponds to a peak power of >100 kW. As expected, the pulse duration decreases and the corresponding peak power increases with the extracted pulse energy. The results from different repetition rates all lie on the same curve, indicating that, for a given pulse energy, the pulse duration does not depend on the repetition rate [1]. Moreover, at low repetition rates and high pump powers, the gain is saturated with maximum pulse energy of 1.22 mJ, which is close to the theoretical limit (1.52 mJ) of the 10 cm long PCF when assuming $27 \times 10^{18}$ cm$^{-3}$ Yb ions doping. The amplification of pulses in fibers is theoretically limited by the extractable energy; a good approximation of this is given by: $E\_ext = (N\_0 \, h\nu)/\gamma$, where $N\_0$ is the total initial inversion, h is Planck's constant, $\nu$ is the signal frequency, and $\gamma$ is the saturation factor, which is agreed to be 2 for a three-level system and 1 for a four-level system [1].

The shortest pulse that the inventors achieved with their experimental setup is relatively long (11.2 ns). There are two reasons for this. First, the laser cavity was relatively long (50 cm), and with proper engineering efforts, the cavity could be shortened to 20 cm, which will enable shorter (~5 ns) pulses. Second, the pulse duration generally depends on the pulse energy and output coupler reflectivity; since the Yb concentration and the active medium volume limit the maximal extractable energy, the limited active volume in the short PCF limits the shortest pulse duration that can be reached.

The experimental results show that multi pass-pumping technique considerably enhances pump absorption within a standard, commercially available active fiber. Inventors demonstrated, both in CW and Q-switched operation, highly efficient lasing with a very short (10 cm) rod-type active PCF in an oscillator configuration. The theoretical calculations are highly correlated with the experimental results, demonstrating that the multi pass-pumping scheme has an extreme impact on the pump absorption, yielding as much as a 400% increase in slope efficiency.

Although embodiments of the invention have been described by way of illustration, it will be understood that the invention may be carried out with many variations, modifications, and adaptations, without exceeding the scope of the claims.

BIBLIOGRAPHY

1. D. J. Richardson, I. Nilsson, and W. A. Clarkson, "High power fiber lasers: current status and future perspectives [Invited]," JOSA B 27 (11) B63-B92 (2010).
2. B. Shulga, and A. Ishaaya, "Off-axis pumping of a photonic crystal fiber laser," Appl. Phys. B 101, 701-704 Rapid Communication (2010).
3. B. Rosenstein, A. Shirakov, D. Belker, and A. A. Ishaaya, "Experimental characterization of an off-axis scheme for pumping high power photonic crystal fiber lasers," submitted for publication.
4. A. Ishaaya and B. Shulga, WO 2012/014191.

The invention claimed is:

1. A laser oscillator or amplifier comprising: a short length of active fiber as an amplifying medium; a front side optical configuration; and a rear side optical configuration;
    wherein the front side optical configuration and the rear side optical configuration both comprise optical elements that cause a pump beam to pass back and forth multiple times through the active fiber;
    wherein the front side optical configuration is comprised of the croup of optical elements selected from one of the following groups:
    a. a front lens, a front concave spherical mirror;
    b. a partially reflecting output coupler, a front lens, a front concave spherical mirror;

c. a dichroic mirror, a front lens, a front concave spherical mirror; and
d. a partially reflecting output coupler, a dichroic mirror, a front lens, a front concave spherical mirror.

2. The laser oscillator or amplifier of claim 1 wherein the active fiber is one of: a photonic crystal fiber (PCF), an air-clad fiber, or a special double-clad fiber.

3. The laser oscillator or amplifier of claim 1 wherein the length of the active fiber is in the range of 5 cm to 30 cm.

4. The laser oscillator of claim 1 wherein a back rear side optical configuration is comprised of the group of optical elements selected from one of the following groups:
   a. a dichroic mirror coating on a rear facet of the active fiber, a rear lens and a highly reflecting rear mirror;
   b. a rear concave spherical mirror, a rear lens and a highly reflecting rear mirror;
   c. a dichroic mirror coating on a rear facet of the active fiber and a highly reflecting rear mirror; and
   d. a highly reflecting coating on a rear facet of the active fiber.

5. The amplifier of claim 1 wherein a back rear side optical configuration is comprised of the group of optical elements selected from one of the following groups:
   a. a dichroic mirror coating on a rear facet of the active fiber and a rear lens; and
   b. a rear concave spherical mirror and a rear lens.

6. The laser oscillator of claim 4 wherein group 'a' and group 'b' comprise a Q-switch in pulsed laser configurations.

7. The laser oscillator or amplifier of claim 1 wherein the front side optical configurations in group 'a' and group 'b' are configured for off-axis pumping wherein the pump beam travels from the pump source to a front facet of the active fiber via an optical delivery fiber, which is coupled to the active fiber within the numerical aperture of a pump clad of the active fiber.

8. The laser oscillator or amplifier of claim 1 wherein the front side optical configurations in group 'c' and group 'd' are configured for on-axis pumping wherein the pump beam travels from the pump source to a front facet of the active fiber through free space.

9. The laser oscillator or amplifier of claim 7 wherein front concave spherical mirror has a central opening for a lasing beam and an off-center opening for the pump beam.

10. The laser oscillator or amplifier of claim 8 wherein, in configurations comprising a rear concave spherical mirror, the rear concave spherical mirror has a central opening for a lasing beam and for the pump beam.

11. A method for constructing an efficient multi-pass short fiber laser oscillator, the method comprising positioning a short length of active fiber in the space between one front side optical configuration comprising at least one optical element selected from the group consisting of:
   (a) a front lens, a front concave spherical mirror;
   (b) a partially reflecting output coupler, a front lens, a front concave spherical mirror;
   (c) a dichroic mirror, a front lens, a front concave spherical mirror; and
   (d) a partially reflecting output coupler, a dichroic mirror, a front lens, a front concave spherical mirror; and
one rear side optical configuration is comprised of at least one optical element selected from the group consisting of:
   (e) a dichroic mirror coating on a rear facet of the active fiber, a rear lens and a highly reflecting rear mirror;
   (f) a rear concave spherical mirror, a rear lens and a highly reflecting rear mirror;
   (g) a dichroic mirror coating on a rear facet of the active fiber and a highly reflecting rear mirror; and
   (h) a highly reflecting coating on a rear facet of the active fiber.

12. The method of claim 11 wherein the active fiber is one of: a photonic crystal fiber (PCF), an air-clad fiber, or a special double-clad fiber.

13. The method of claim 11 wherein the length of the active fiber is in the range of 5 cm to 30 cm.

14. A method for constructing an efficient multi-pass short fiber laser amplifier, the method comprising positioning a short length of active fiber in the space between one front side optical configuration comprising at least one optical element selected from the group consisting of:
   (a) a front lens, a front concave spherical mirror;
   (b) a partially reflecting output coupler, a front lens, a front concave spherical mirror;
   (c) a dichroic mirror, a front lens, a front concave spherical mirror; and
   (d) a partially reflecting output coupler, a dichroic mirror, a front lens, a front concave spherical mirror; and
one rear side optical configuration is comprised of at least one optical element selected from the group consisting of:
   (e) a dichroic mirror coating on a rear facet of the active fiber, a rear lens and a highly reflecting rear mirror;
   (f) a rear concave spherical mirror, a rear lens and a highly reflecting rear mirror;
   (g) a dichroic mirror coating on a rear facet of the active fiber and a highly reflecting rear mirror; and
   (h) a highly reflecting coating on a rear facet of the active fiber.

15. The method of claim 14 wherein the active fiber is one of: a photonic crystal fiber (PCF), an air-clad fiber, or a special double-clad fiber.

16. The method of claim 14 wherein the length of the active fiber is in the range of 5 cm to 30 cm.

17. The laser oscillator or amplifier of claim 1 wherein:
   a. group 'a' additionally comprises a partially reflecting coating on a front facet of the active fiber;
   b. group 'b' additionally comprises an anti-reflecting coating on a front facet of the active fiber;
   c. group 'c' additionally comprises a partially reflecting coating on a front facet of the active fiber; and
   d. group 'd' additionally comprises an anti-reflecting coating on a front facet of the active fiber.

18. The laser oscillator of claim 4 wherein group 'b' additionally comprises an anti-reflecting coating on a rear facet of the active fiber.

19. The amplifier of claim 5 wherein group 'b' additionally comprises an anti-reflecting coating on a rear facet of the active fiber.

20. The method of claim 11 wherein:
   group 'a' additionally comprises a partially reflecting coating on a front facet of the active fiber;
   group 'b' additionally comprises an anti-reflecting coating on a front facet of the active fiber;
   group 'c' additionally comprises a partially reflecting coating on a front facet of the active fiber;
   group 'd' additionally comprises an anti-reflecting coating on a front facet of the active fiber; and
   group 'f' additionally comprises an anti-reflecting coating on a front facet of the active fiber.

21. The method of claim 14 wherein:
   group 'a' additionally comprises a partially reflecting coating on a front facet of the active fiber;
   group 'b' additionally comprises an anti-reflecting coating on a front facet of the active fiber;

group 'c' additionally comprises a partially reflecting coating on a front facet of the active fiber;
group 'd' additionally comprises an anti-reflecting coating on a front facet of the active fiber; and
group 'f' additionally comprises an anti-reflecting coating on a rear facet of the active fiber.

* * * * *